United States Patent
Signore et al.

(10) Patent No.: US 7,944,079 B1
(45) Date of Patent: May 17, 2011

(54) SYSTEMS AND METHODS FOR ASSEMBLING A GEARBOX HANDLING ASSEMBLY FOR USE IN A WIND TURBINE

(75) Inventors: Jonathan Paul Signore, Schenectady, NY (US); Michael S. Koronkiewicz, Schenectady, NY (US); Christopher D. Cheng, Schenectady, NY (US); Stephen John Jutton, Simpsonville, SC (US); Charles Van Buchan, Greer, SC (US); James Bradford Holmes, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/764,437

(22) Filed: Apr. 21, 2010

(51) Int. Cl.
*F03D 9/00* (2006.01)
*H02P 9/04* (2006.01)

(52) U.S. Cl. ............................. 290/55; 290/44
(58) Field of Classification Search .................. 290/44, 290/55
See application file for complete search history.

(56) References Cited

U.S. PATENT DOCUMENTS

| | | | | |
|---|---|---|---|---|
| 3,665,148 A * | 5/1972 | Yasenchak et al. | .......... | 219/124.4 |
| 4,039,038 A * | 8/1977 | Wilhelm | .......... | 180/377 |
| 4,118,637 A * | 10/1978 | Tackett | .......... | 290/55 |
| 4,239,977 A * | 12/1980 | Strutman | .......... | 290/44 |
| 4,297,071 A * | 10/1981 | Dunbar | .......... | 414/542 |
| 4,329,117 A * | 5/1982 | Doman | .......... | 416/170 R |
| 4,402,380 A * | 9/1983 | Strong | .......... | 180/292 |
| 4,428,710 A * | 1/1984 | Grisebach et al. | .......... | 414/590 |
| 4,702,668 A * | 10/1987 | Carlisle et al. | .......... | 414/744.5 |
| 4,757,211 A * | 7/1988 | Kristensen | .......... | 290/55 |
| 5,269,644 A * | 12/1993 | Vatel | .......... | 414/744.3 |
| 5,277,270 A * | 1/1994 | Hasegawa | .......... | 180/378 |
| 5,459,918 A * | 10/1995 | Uchida et al. | .......... | 29/434 |
| 6,232,673 B1 * | 5/2001 | Schoo et al. | .......... | 290/55 |
| 6,408,974 B1 * | 6/2002 | Viduya et al. | .......... | 180/312 |
| 6,609,889 B1 | 8/2003 | Vilsboll | .......... | 416/1 |
| 6,750,559 B2 * | 6/2004 | Becker | .......... | 290/55 |
| 6,833,632 B2 * | 12/2004 | Becker et al. | .......... | 290/55 |
| 6,879,055 B2 * | 4/2005 | Becker et al. | .......... | 290/55 |
| 7,360,310 B2 | 4/2008 | Bagepalli et al. | .......... | 29/898.08 |
| 7,719,129 B2 * | 5/2010 | Hahlbeck | .......... | 290/55 |
| 7,759,815 B2 * | 7/2010 | Christensen | .......... | 290/55 |
| 7,789,189 B2 * | 9/2010 | Bigg et al. | .......... | 180/377 |

(Continued)

FOREIGN PATENT DOCUMENTS

EP 1291521 A1 3/2003

(Continued)

*Primary Examiner* — Pedro J Cuevas
(74) *Attorney, Agent, or Firm* — James McGinness, Esq.; Armstrong Teasdale LLP

(57) ABSTRACT

A method of assembling a gearbox handling assembly to facilitate removal of a gearbox from a wind turbine uptower from the wind turbine. The wind turbine includes a rotor rotatably coupled to the gearbox with a rotor shaft. The gearbox and the rotor shaft are supported from a support frame. The method includes coupling a support assembly between the gearbox and the support frame for supporting the gearbox from the support frame. A positioning assembly is coupled to the support frame. The positioning assembly is configured to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine.

20 Claims, 6 Drawing Sheets

U.S. PATENT DOCUMENTS

| | | | |
|---|---|---|---|
| 2003/0071469 A1* | 4/2003 | Becker | 290/55 |
| 2003/0080566 A1* | 5/2003 | Becker et al. | 290/55 |
| 2007/0025840 A1 | 2/2007 | Weaver et al. | 415/122.1 |
| 2008/0199309 A1 | 8/2008 | Bagepalli et al. | 415/170.1 |
| 2008/0309091 A1* | 12/2008 | Hahlbeck | 290/55 |
| 2009/0107255 A1* | 4/2009 | Jensen | 73/862 |
| 2009/0149293 A1* | 6/2009 | Van Bogaert et al. | 475/348 |
| 2009/0162202 A1 | 6/2009 | Nies et al. | 416/147 |
| 2009/0261594 A1* | 10/2009 | Christensen | 290/55 |
| 2010/0296933 A1* | 11/2010 | Hicks et al. | 416/170 R |
| 2010/0329867 A1* | 12/2010 | Patel et al. | 416/169 R |

FOREIGN PATENT DOCUMENTS

| | | |
|---|---|---|
| EP | 1617075 A1 | 1/2006 |
| WO | 2008059088 A1 | 5/2008 |

* cited by examiner

SYSTEMS AND METHODS FOR ASSEMBLING A GEARBOX HANDLING ASSEMBLY FOR USE IN A WIND TURBINE

BACKGROUND OF THE INVENTION

The subject matter described herein relates generally to methods and systems for assembling a gearbox handling assembly for use in a wind turbine.

At least some known wind turbine towers include a nacelle fixed atop a tower. The nacelle includes a rotor assembly coupled to a gearbox and to a generator through a rotor shaft. In known rotor assemblies, a plurality of blades extend from a rotor. The blades are oriented such that wind passing over the blades turns the rotor and rotates the shaft, thereby driving the generator to generate electricity.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the gearbox assembly and/or other components of the wind turbine.

At least some known wind turbines include an electric generator and a gearbox each positioned within the nacelle. The electric generator is coupled to the gearbox with a high speed shaft. At least some known gearbox assemblies facilitate transferring rotational energy from a low speed rotor shaft to a high speed shaft that rotatably drives the generator to facilitate producing electrical power. Over time, the bearings which support the high speed shaft may become worn. As the bearings become worn, the gearbox assembly becomes less effective in transferring rotational energy to the generator. In some cases, the bearings fail which results in damage to the bearing bores. In at least some known wind turbines, the repair of the gearbox requires the entire nacelle, gearbox, and rotor to be removed from the wind turbine prior to removing the gearbox and repairing and/or replacing the damaged gearbox. In some wind turbines, the blades are between 60 and 100 meters in length, and as such, repairing worn or damaged gearboxes can be costly and time-consuming.

Accordingly, it is desirable to provide a system and method for removing and/or replacing the gearbox uptower without removing the rotor and/or the rotor shaft from the wind turbine.

BRIEF DESCRIPTION OF THE INVENTION

In one aspect, a method of assembling a gearbox handling assembly to facilitate removal of a gearbox from a wind turbine uptower from the wind turbine is provided. The wind turbine includes a rotor rotatably coupled to the gearbox with a rotor shaft. The gearbox and the rotor shaft are supported from a support frame. The method includes coupling a support assembly between the gearbox and the support frame for supporting the gearbox from the support frame. A positioning assembly is coupled to the support frame. The positioning assembly is configured to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine.

In another aspect, a gearbox handling assembly for use in a wind turbine is provided. The wind turbine includes a rotor that is rotatably coupled to a gearbox with a rotor shaft and a support frame that is configured to support the gearbox and the rotor shaft. The gearbox handling assembly includes a support assembly coupled between the gearbox and the support frame for supporting the gearbox from the support frame. A positioning assembly is coupled to the support frame. The positioning assembly is adapted to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine.

In yet another aspect, a wind turbine is provided. The wind turbine includes a tower, a nacelle coupled to the tower, a gearbox positioned within the nacelle, a rotor, and a rotor shaft rotatably coupling the rotor to the gearbox. A support frame is coupled to the gearbox and to the rotor shaft for supporting the gearbox and the rotor shaft within the nacelle. A gearbox handling assembly is coupled to the rotor shaft and to the gearbox. The gearbox handling assembly includes a support assembly coupled between the gearbox and the support frame for supporting the gearbox from the support frame. A positioning assembly is coupled to the support frame. The positioning assembly is configured to contact the gearbox to move the gearbox between a first position wherein the gearbox is operatively coupled to the rotor shaft and a second position wherein the gearbox is operatively decoupled and spaced from the rotor shaft to facilitate removing the gearbox from the nacelle uptower of the wind turbine.

The embodiments described herein facilitate removing and/or replacing a gearbox assembly without requiring removal of the rotor and/or the rotor shaft from the wind turbine. More specifically, the gearbox handling assembly described herein facilitates supporting the rotor shaft during removal of the gearbox such that the rotor and the rotor shaft continues to be supported by the bedplate during removal of the gearbox from the wind turbine.

DETAILED DESCRIPTION OF THE INVENTION

The embodiments described herein include a wind turbine system that enables the maintenance of the gearbox assembly without requiring the nacelle, rotor, and/or rotor shaft of the wind turbine to be removed. More specifically, the gearbox handling assembly described herein enables the gearbox to be removed and/or replaced uptower without requiring the rotor shaft and/or the rotor to be removed. As used herein, the term "uptower" is intended to be representative of any location of the wind turbine that is above a top portion of a wind turbine tower, for example, any location within or outside of the nacelle and/or rotor while the nacelle and/or rotor are coupled to the top portion of the wind turbine tower.

Figure 1:
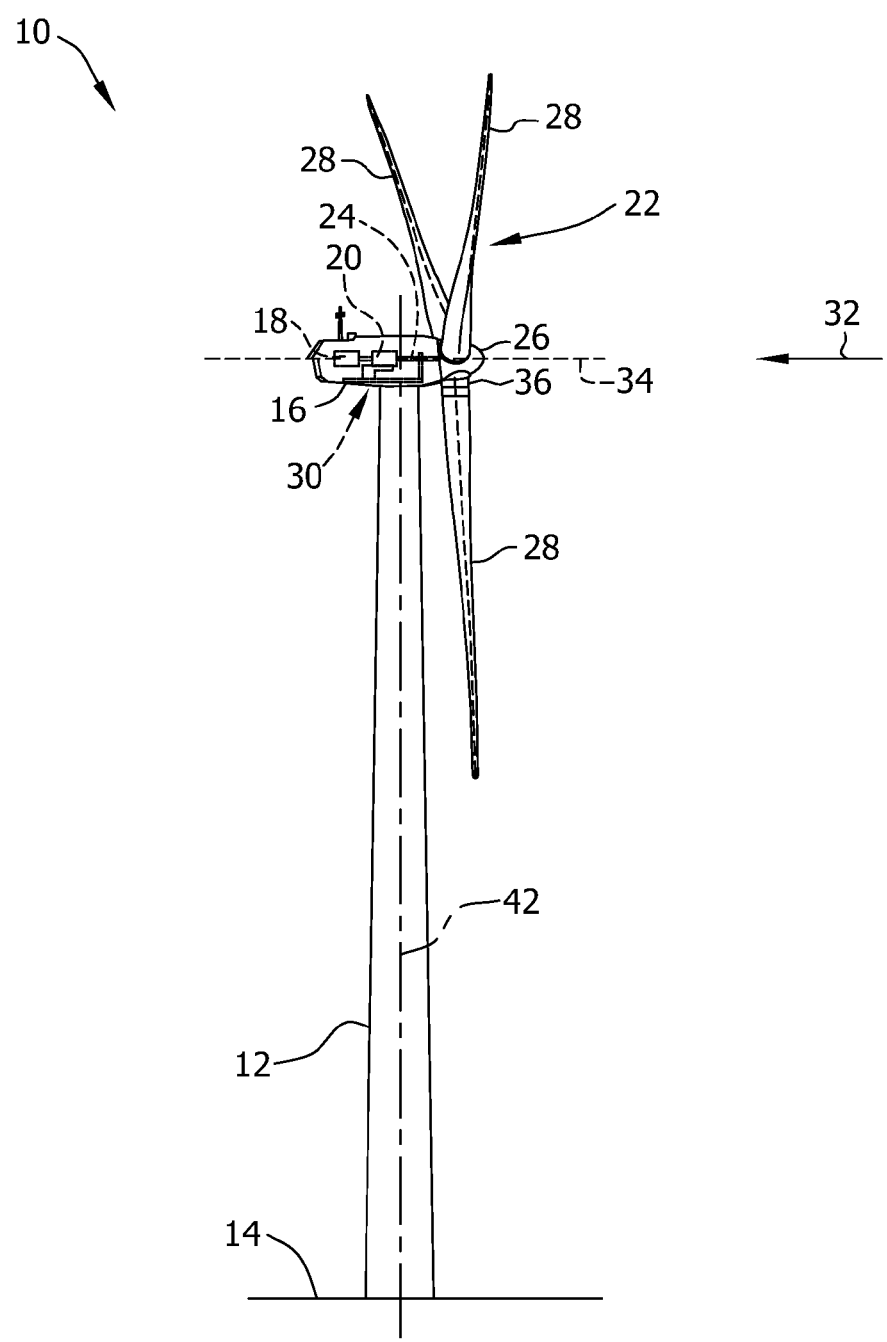
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, a generator 18 positioned within nacelle 16, a gearbox 20 coupled to generator 18, and a rotor 22 that is rotatably coupled to gearbox 20 with a rotor shaft 24. Rotor 22 includes a rotatable hub 26 and at least one rotor blade 28 coupled to and extending outward from hub 26. A gearbox handling assembly 30 is coupled to gearbox 20 to facilitate removing gearbox 20 from nacelle 16 uptower of wind turbine 10. In an alternative embodiment, gearbox handling assembly 30 is coupled to generator 18 to facilitate removing generator 18 from nacelle 16 uptower of wind turbine 10. In another alternative embodiment, gearbox handling assembly 30 is coupled to generator 18 and/or gearbox 20 to facilitate removing generator 18 and/or gearbox 20 from nacelle 16 uptower of wind turbine 10.

In the exemplary embodiment, rotor 22 includes three rotor blades 28. In an alternative embodiment, rotor 22 includes more or less than three rotor blades 28. In the exemplary embodiment, tower 12 is fabricated from tubular steel to define a cavity (not shown in FIG. 1) that extends between support surface 14 and nacelle 16. In an alternative embodiment, tower 12 is any suitable type of tower having any suitable height.

Rotor blades 28 are spaced about hub 26 to facilitate rotating rotor 22 to enable kinetic energy to be transferred from the wind into usable mechanical energy, and subsequently, electrical energy. In the exemplary embodiment, rotor blades 28 have a length ranging from about 30 meters (m) (99 feet (ft)) to about 120 m (394 ft). Alternatively, rotor blades 28 may have any suitable length that enables wind turbine 10 to function as described herein. For example, other non-limiting examples of rotor blade lengths include 10 m or less, 20 m, 37 m, or a length that is greater than 120 m. As wind strikes rotor blades 28 from a direction 32, rotor 22 is rotated about an axis of rotation 34. As rotor blades 28 are rotated and subjected to centrifugal forces, rotor blades 28 are also subjected to various forces and moments. As such, rotor blades 28 may deflect and/or rotate from a neutral, or non-deflected, position to a deflected position. Moreover, a pitch angle or blade pitch of rotor blades 28, i.e., an angle that determines a perspective of rotor blades 28 with respect to direction 32 of the wind, may be changed by a pitch adjustment system 36 to control the load and power generated by wind turbine 10 by adjusting an angular position of at least one rotor blade 28 relative to wind vectors.

Figure 2:
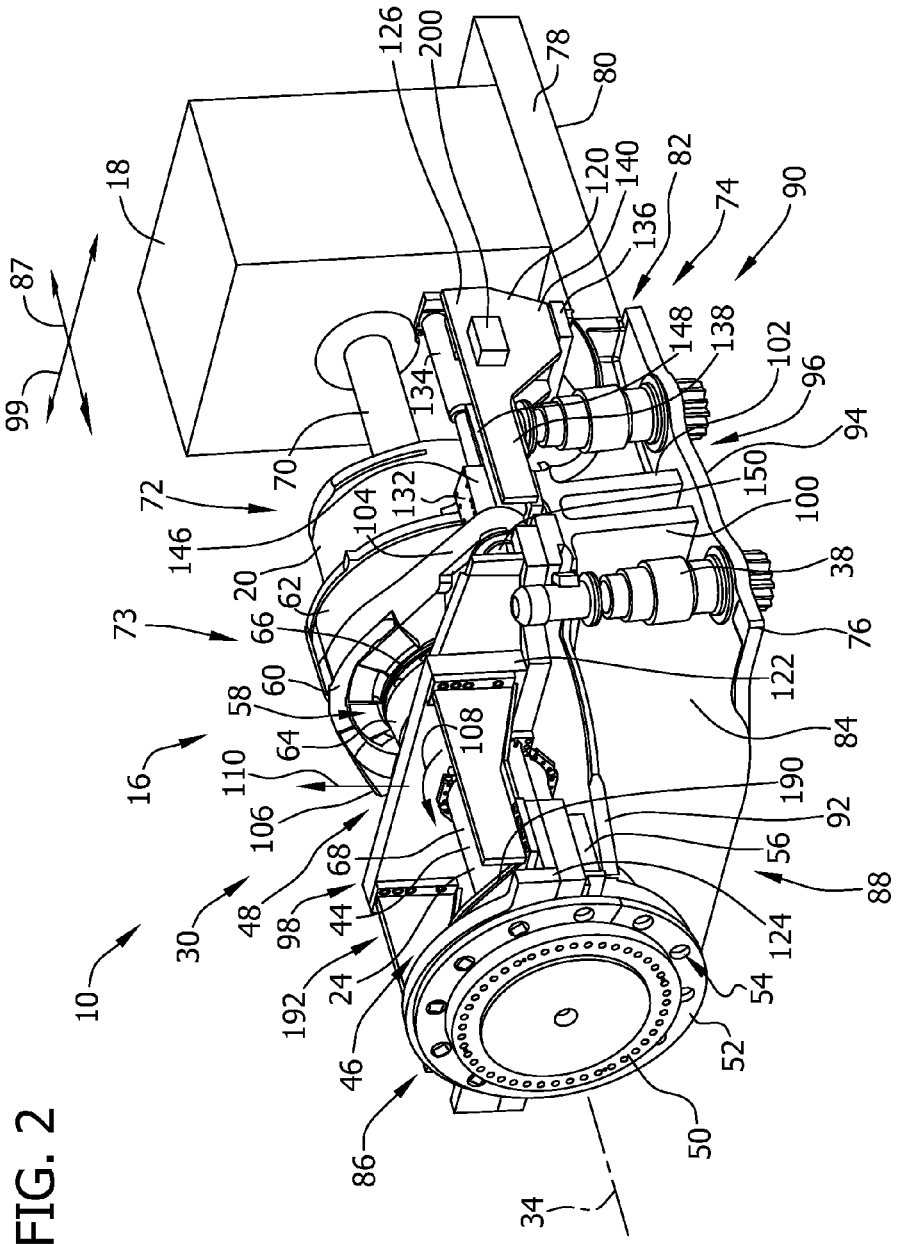
FIG. 2 is an enlarged perspective view of a portion of the wind turbine shown in FIG. 1 including an exemplary gearbox handling assembly.
Figure 3:
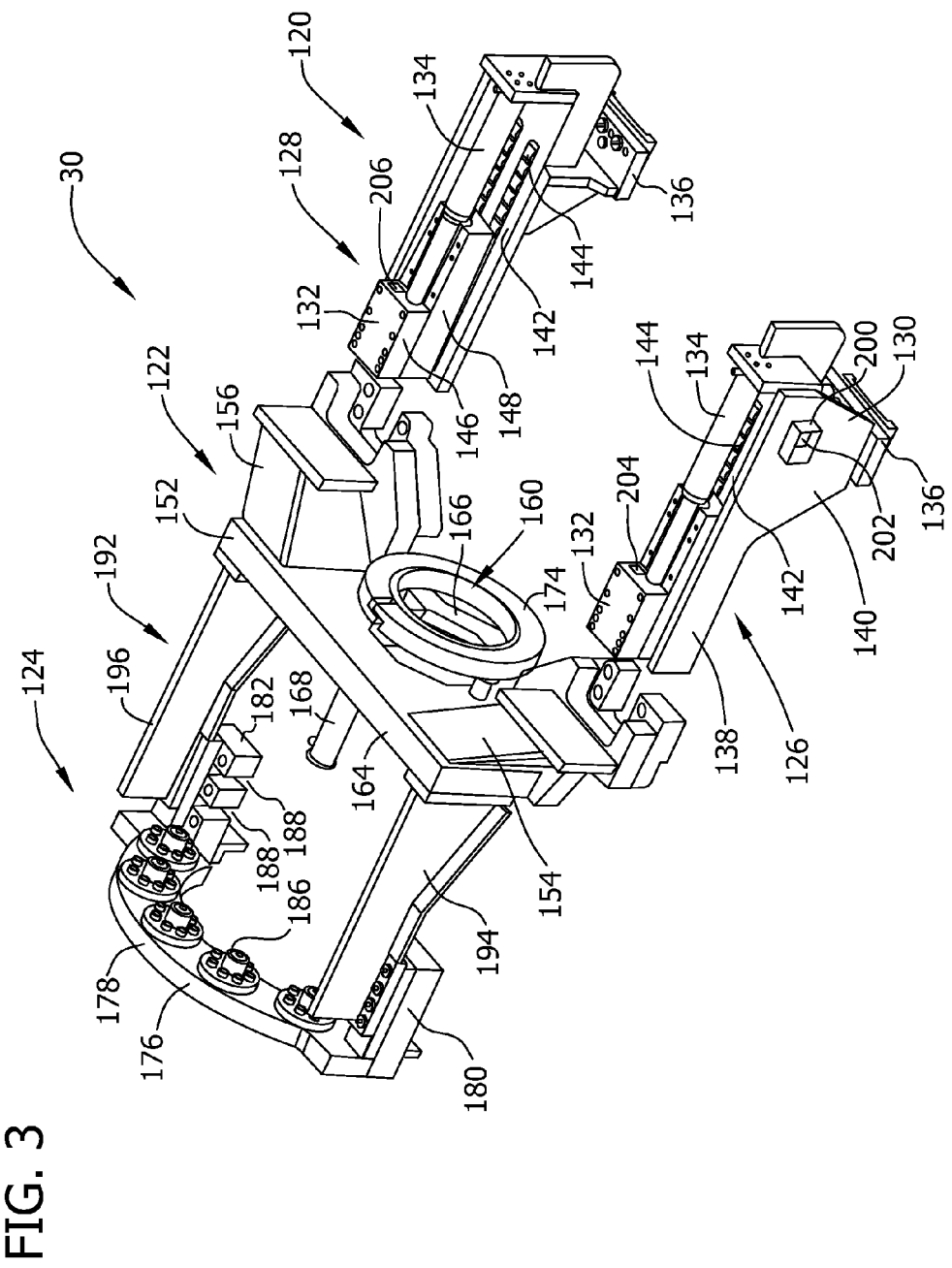
FIG. 3 is an exploded perspective view of the gearbox handling assembly shown in FIG. 2.
Figure 4:
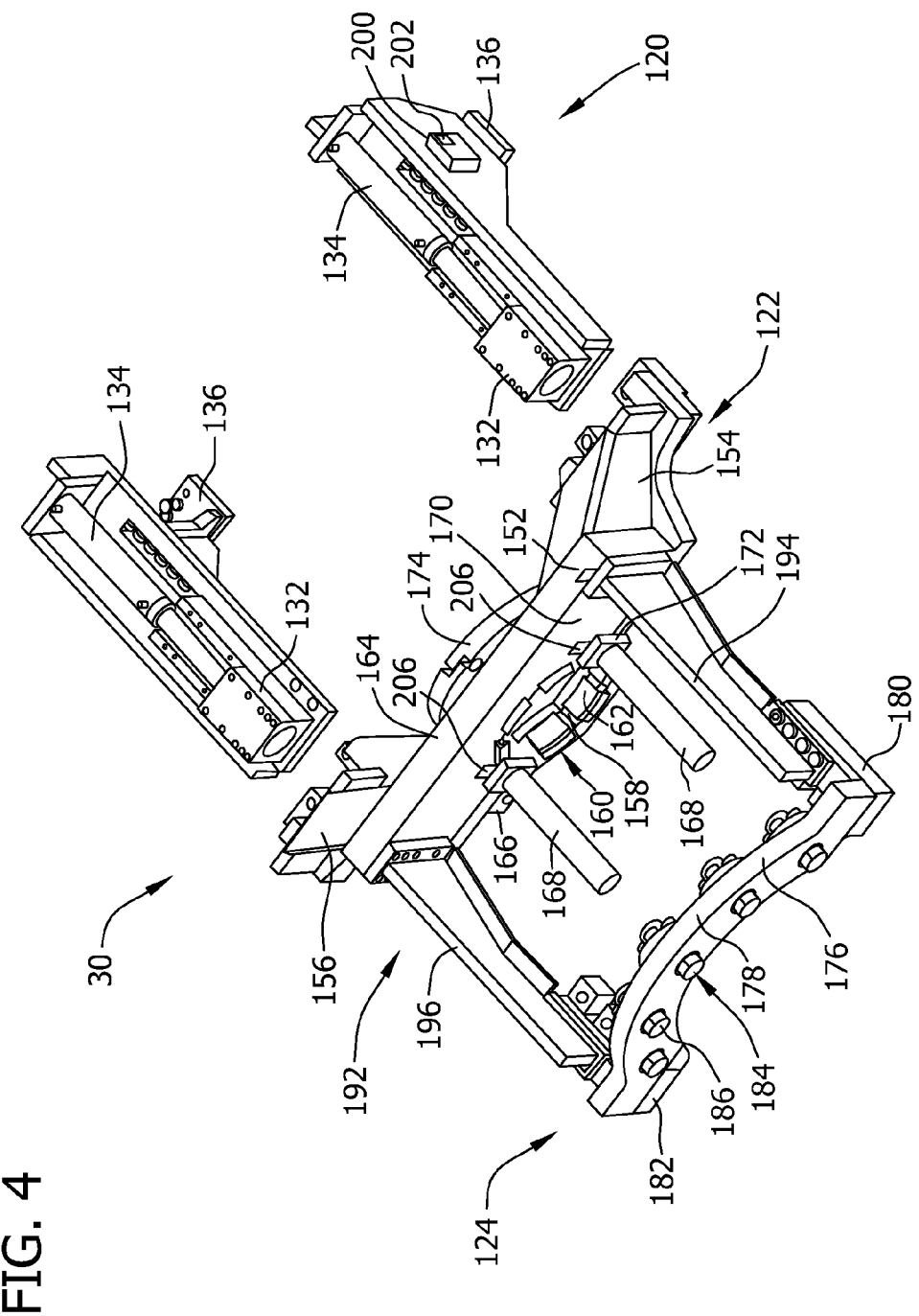
FIG. 4 is another exploded perspective view of the gearbox handling assembly shown in FIG. 2.

FIG. 2 is an enlarged perspective view of a portion of wind turbine 10. FIG. 3 is an exploded perspective view of gearbox handling assembly 30. FIG. 4 is another exploded perspective view of gearbox handling assembly 30. Identical components shown in FIG. 3 and FIG. 4 are labeled with the same reference numbers used in FIG. 2. In the exemplary embodiment, nacelle 16 includes rotor shaft 24, gearbox 20, generator 18, and a yaw drive mechanism 38. Yaw drive mechanism 38 facilitates rotating nacelle 16 and hub 26 on yaw axis 42 (shown in FIG. 1) to control the perspective of rotor blades 28 with respect to direction 32 of the wind. Rotor shaft 24 includes a substantially cylindrical body 44 that extends between a first end 46 and an opposite second end 48. First end 46 is coupled to rotor 22 (shown in FIG. 1). More specifically, rotor shaft 24 includes a rotor flange 50 that is fixedly coupled to rotor shaft first end 46. Hub 26 is coupled to rotor flange 50 such that a rotation of hub 26 about axis 34 facilitates rotating rotor shaft 24 about axis 34. A rotor locking disk 52 is coupled to first end 46 of rotor shaft 24. Rotor locking disk 52 defines a plurality of openings 54 each extending through rotor locking disk 52 and positioned circumferentially about rotor locking disk 52. In the exemplary embodiment, wind turbine 10 also includes a shaft support bearing 56. Shaft support bearing 56 facilitates radial support and alignment of rotor shaft 24. In one embodiment, shaft support bearing 56 is coupled to first end 46 of rotor shaft 24 near hub 26. In an alternative embodiment, wind turbine 10 may include any number of support bearings that enable wind turbine 10 to function as described herein.

Second end 48 is rotatably coupled to gearbox 20. In the exemplary embodiment, gearbox 20 includes an opening 58 that extends through a forward section 60 of a gearbox housing 62. Opening 58 is sized to receive second end 48. Gearbox 20 includes a input shaft 64 coupled to forward section 60. Input shaft 64 is configured to receive second end 48 of rotor shaft 24. Input shaft 64 includes a substantially circular inner surface (not shown) that defines an opening (not shown) sized to receive rotor shaft 24 therein. A shrink disk 66 is coupled to input shaft 64 and extends radially outwardly from input shaft 64 such that input shaft 64 is between shrink disk 66 and rotor shaft 24. Shrink disk 66 is configured to compress input shaft 64 about an outer surface 68 of rotor shaft 24 to facilitate coupling input shaft 64 to rotor shaft 24 via a friction fit. A high speed shaft 70 is coupled between a rearward portion 72 of gearbox 20 and generator 18. During operation of wind turbine 10, a rotation of rotor shaft 24 rotatably drives gearbox 20 that subsequently drives high speed shaft 70. High speed shaft 70 rotatably drives generator 18 to facilitate production of electrical power by generator 18. Rotor shaft 24, generator 18, gearbox 20, high speed shaft 70, and/or shaft support bearing 56, are sometimes referred to as a drive train 73. In the exemplary embodiment, drive train 73 is supported by drive train support assembly 74. Drive train support assembly 74 includes a bedplate support frame 76 and a generator frame 78 that is cantilevered from bedplate support frame 76. In one embodiment, generator frame 78 includes at least one support member 80 extending outward from bedplate support frame 76. Support member 80 is coupled to bedplate support frame 76 at a joint 82. Gearbox 20, rotor shaft 24, and shaft support bearing 56 are each supported by bedplate support frame 76. Generator 18 is supported by generator frame 78.

In the exemplary embodiment, bedplate support frame 76 includes a first sidewall 84 and an opposite second sidewall 86 each extending in a longitudinal direction 87 between a front section 88 and a rear section 90. First sidewall 84 and second sidewall 86 each include a top plate 92 and a bottom plate 94. A first pedestal assembly 96 is coupled to first sidewall 84 and extends between top plate 92 and bottom plate 94. A second pedestal assembly 98 is coupled to second sidewall 86 and extends between top plate 92 and bottom plate 94. Second pedestal assembly 98 is aligned with first pedestal assembly 96 in a transverse direction 99 that is perpendicular to longitudinal direction 87. First pedestal assembly 96 and second pedestal assembly 98 are each positioned between front section 88 and rear section 90. First pedestal assembly 96 and second pedestal assembly 98 each include a forward beam 100 and a rear beam 102 positioned adjacent forward beam 100. In the exemplary embodiment, gearbox 20 includes a first torque arm 104 and a second torque arm 106 that is opposite first torque arm 104. First torque arm 104 and second torque arm 106 each extend radially outwardly from front section 88 of gearbox housing 62. First torque arm 104 is coupled to first pedestal assembly 96 and second torque arm 106 is coupled to second pedestal assembly 98 to facilitate supporting gearbox 20 from bedplate support frame 76.

Shaft support bearing 56 is coupled to front section 88 of bedplate support frame 76 and extends in transverse direction 99 between first sidewall 84 and second sidewall 86. Rotor shaft 24 extends through shaft support bearing 56 and is supported by shaft support bearing 56 and gearbox 20. In the exemplary embodiment, rotor 22 (shown in FIG. 1) is coupled to rotor shaft 24 such that rotor 22 is supported by shaft support bearing 56 and by gearbox 20 with rotor shaft 24.

Referring further to FIG. 2, during operation of wind turbine 10, a rotation of rotor 22 rotates rotor shaft 24 about an axis 34 such that a rotational moment (represented by arrows 108) is imparted from rotor shaft 24 to gearbox 20. Additionally, as rotor 22 is supported from shaft support bearing 56 with rotor shaft 24, rotor shaft 24 imparts an upward force (represented by arrow 110) to gearbox 20. First torque arm 104 and second torque arm 106 are configured to transfer rotational moment 108 and upward force 110 from gearbox 20 to bedplate support frame 76 with first pedestal assembly 96 and second pedestal assembly 98. During operation of wind turbine 10, gearbox 20 may require a repair and/or replacement. Gearbox handling assembly 30 is configured to facilitate removing and/or replacing gearbox 20 uptower of wind turbine 10. Gearbox handling assembly 30 is further configured to facilitate removing gearbox 20 from nacelle 16 without removing rotor shaft 24 from nacelle 16 and/or uncoupling rotor 22 from rotor shaft 24 and removing rotor 22 from wind turbine 10. More specifically, gearbox handling assembly 30 is coupled to gearbox 20, to rotor shaft 24, and to bedplate support frame 76 to facilitate removing and/or replacing gearbox 20 uptower of wind turbine 10 without requiring rotor 22 and/or rotor shaft 24 to be uncoupled from nacelle 16 and removed from wind turbine 10.

In the exemplary embodiment, gearbox handling assembly 30 is configured to facilitate moving gearbox 20 between a first position (shown in FIG. 2) and a second position (not shown). In the first position, gearbox 20 is operatively coupled to rotor shaft 24 such that rotor shaft 24 is at least partially inserted into gearbox opening 58 and through input shaft 64. In the second position, gearbox 20 is operatively decoupled and spaced from rotor shaft 24 to facilitate removing gearbox 20 from nacelle 16 without removing rotor shaft 24 from nacelle 16. In the second position, rotor shaft 24 is not in contact with gearbox 20. In the second position, gearbox 20 may be removed from wind turbine 10 without removing rotor shaft 24 from nacelle and/or uncoupling rotor 22 from rotor shaft 24 and removing rotor 22 from wind turbine 10.

In the exemplary embodiment, gearbox handling assembly 30 includes a support assembly 120, a positioning assembly 122, and a rotor shaft locking assembly 124. An exemplary rotor shaft locking assembly is disclosed in a co-pending U.S. patent application entitled "Systems and Methods for Assembling A Rotor Lock Assembly for use in a Wind Turbine", filed on the same date as the present application by Lead Inventor, Michael S. Koronkiewicz. Support assembly 120 is coupled between bedplate support frame 76 and gearbox 20 for supporting gearbox 20 from bedplate support frame 76. More specifically, support assembly 120 is coupled to first pedestal assembly 96, second pedestal assembly 98, and rear section 90 of bedplate support frame 76. Support assembly 120 is configured to move gearbox 20 between the first position and the second position. Support assembly 120 includes a first control sled assembly 126 and a second control sled assembly 128. Second control sled assembly 128 is substantially similar to first control sled assembly 126. First control sled assembly 126 is coupled to first sidewall 84 and extends between first pedestal assembly 96 and bedplate frame joint 82. Second control sled assembly 128 is coupled to second sidewall 86 and extends between second pedestal assembly 98 and bedplate frame joint 82.

First control sled assembly 126 and second control sled assembly 128 each include a support sled 130, a support block 132, a control actuator 134 coupled to support block 132, and a leveling assembly 136 coupled to support sled 130. Support sled 130 includes a top portion 138 and a bottom portion 140. Bottom portion 140 is supported from bedplate support frame 76 and/or generator frame 78 at or near joint 82. In one embodiment, bottom portion 140 is coupled to bedplate support frame 76. In an alternative embodiment, bottom portion 140 is not coupled to bedplate support frame 76 and is in slideable contact with bedplate support frame 76. Top portion 138 extends longitudinally outwardly from bottom portion 140 and is coupled to rear beam 102 of first pedestal assembly 96 such that gearbox 20 is supported from bedplate support frame 76 at first pedestal assembly 96 and at bedplate rear section 90.

Support block 132 is slideably coupled to a top surface 142 of support sled 130. In one embodiment, support sled 130 includes a guiderail 144 positioned between support block 132 and top surface 142 to facilitate moving support block 132 along top surface 142. Support block 132 is coupled to gearbox torque arm 104 for supporting gearbox 20 from support sled 130. Support block 132 includes an upper block 146 and a lower block 148. A torque cylinder 150 (shown in FIG. 2) extends from gearbox torque arm 104 and is positioned between upper block 146 and lower block 148 to facilitate coupling gearbox 20 to support block 132. Control actuator 134 is coupled to support block 132 and is configured to move support block 132 and gearbox 20 along top surface 142 in longitudinal direction 87.

In one embodiment, control actuator 134 includes a hydraulic actuator. In an alternative embodiment, control actuator 134 includes a mechanical actuator, such as a screw-type actuator or any other actuator that enables support assembly 120 to function as described herein. In the exemplary embodiment, leveling assembly 136 is coupled between support sled 130 and bedplate support frame 76. Leveling assembly 136 is configured to increase and/or decrease a height of support sled 130 to facilitate aligning support block 132 with torque arm 104.

Positioning assembly 122 is coupled to second end 48 of rotor shaft 24 and to bedplate support frame 76 to facilitate limiting an upward movement of rotor shaft 24 in the direction of upward force 110. More specifically, positioning assembly 122 is configured to transfer upward force 110 to bedplate support frame 76, such that gearbox 20 is not subjected to upward force 110 from rotor shaft 24. Additionally, positioning assembly 122 is in contact with gearbox 20 to facilitate moving gearbox 20 in longitudinal direction 87 along support sled 130. In the exemplary embodiment, positioning assembly 122 includes a yoke assembly 152 extending transversely between first sidewall 84 and second sidewall 86. Yoke assembly 152 is coupled between first pedestal assembly 96 and second pedestal assembly 98 to facilitate transferring upward force 110 from rotor shaft 24 to bedplate support frame 76. Yoke assembly 152 extends between a first support arm 154 and a second support arm 156 that is opposite first support arm 154. First support arm 154 is coupled to first pedestal forward beam 100. Second support arm 156 is coupled to second pedestal forward beam (not shown). Yoke assembly 152 includes an interior surface 158 that defines an opening 160 extending through yoke assembly 152. Opening 160 is sized to receive rotor shaft 24 therethrough. In one embodiment, a plurality of support pads 162, shown in FIG. 4, are coupled to and positioned circumferentially about interior surface 158 and are configured to facilitate preventing damage to rotor shaft 24 during removal and/or replacement of gearbox 20. In one embodiment, yoke assembly 152 includes a top section 164 coupled to a bottom section 166 that defines opening 160. In an alternative embodiment, yoke assembly 152 is formed as a unitary member. In the exemplary embodiment, positioning assembly 122 includes at least one positioning actuator 168 in contact with gearbox 20 for moving gearbox 20 between the first position and the second position. Positioning actuator 168 is coupled to a front side 170 of yoke assembly 152 and extends through an actuator opening 172 defined through yoke assembly 152 to contact gearbox forward section 60. In one embodiment, positioning actuator 168 includes a hydraulic actuator. In an alternative embodiment, positioning actuator 168 includes a mechanical actuator, such as a screw-type actuator or any other actuator that enables positioning assembly 122 to function as described herein. In the exemplary embodiment, positioning assembly 122 includes a push ring 174 positioned between positioning actuator 168 and gearbox 20. Push ring 174 is coupled to positioning actuator 168 and is in contact with gearbox 20 to facilitate uniformly distributing a pushing load from positioning actuator 168 to gearbox 20. In one embodiment, push ring 174 is coupled to input shaft 64.

Rotor shaft locking assembly 124 is coupled to front section 88 of bedplate support frame 76 and to rotor locking disk 52 to facilitate limiting a rotation of rotor shaft 24. Rotor shaft locking assembly 124 includes a rotor lock housing 176 extending between first sidewall 84 and second sidewall 86 of bedplate support frame 76 in transverse direction 99. Rotor lock housing 176 includes an upper support plate 178 extending between a first support pad 180 and a second support pad 182. Upper support plate 178 defines a plurality of openings 184 extending through upper support plate 178. Each opening 184 is sized to receive a rotor lock pin assembly 186. Rotor shaft locking assembly 124 is positioned adjacent rotor locking disk 52 such that rotor lock pin assembly 186 is inserted through opening 184 and extends into corresponding opening 54 of rotor locking disk 52. In the exemplary embodiment, upper support plate 178 has an arcuate shape such that openings 184 are aligned with corresponding rotor locking disk openings 54 spaced circumferentially about rotor locking disk 52. In an alternative embodiment, upper support plate 178 is coupled to rotor shaft 24 via a friction fit to facilitate limiting a rotation of rotor shaft 24. In a further alternative embodiment, rotor shaft locking assembly 124 is coupled to hub 26 (shown in FIG. 1) to facilitate limiting a rotation of rotor shaft 24. In the exemplary embodiment, rotor shaft locking assembly 124 is coupled to shaft support bearing 56 such that shaft support bearing 56 supports rotor shaft locking assembly 124 from bedplate support frame 76. More specifically, first support pad 180 extends outwardly from upper support plate 178 and is coupled to shaft support bearing 56 at or near first sidewall 84. Second support pad 182 extends outwardly from upper support plate 178 and is coupled to shaft support bearing 56 at or near second sidewall 86. In one embodiment, first support pad 180 and second support pad 182 each define a plurality of slots 188 sized to receive corresponding bearing support braces 190.

In the exemplary embodiment, a yoke brace system 192 is coupled between positioning assembly 122 and rotor shaft locking assembly 124. In the exemplary embodiment, yoke brace system 192 includes a first brace 194 and an opposite second brace 196 each extending between positioning assembly 122 and rotor shaft locking assembly 124.

In the exemplary embodiment, a control system 200 is operatively coupled to gearbox handling assembly 30. Control system 200 is communicatively coupled to gearbox handling assembly 30 for operating positioning assembly 122 and/or support assembly 120. Control system 200 includes a controller 202 and at least one sensor 204 communicatively coupled to controller 202. In the exemplary embodiment, controller 202 is operatively coupled to control actuator 134 and to positioning actuator 168. Positioning sensors 206 are coupled to control actuator 134 and to positioning actuator 168 and are configured to sense a position of control actuator 134 and positioning actuator 168. Positioning sensors 206 are further configured to transmit a signal indicative of a position of control actuator 134 and/or positioning actuator 168 to controller 202. Controller 202 is configured to receive signals from positioning sensors 206 and to determine a position of gearbox 20 based on the received signals. In the exemplary embodiment, controller 202 is configured to operate positioning actuator 168 and/or control actuator 134 to move gearbox 20 between the first position and the second position. In one embodiment, controller 202 is further configured to operate positioning actuator 168 and control actuator 134 in synchronicity such that positioning actuator 168 and control actuator 134 are moved at a substantially equal rate of movement. During operation of gearbox handling assembly 30, control system 200 operates positioning actuator 168 to contact forward section 60 of gearbox 20. Control system 200 further operates control actuator 134 to contact torque arms 104 and 106 of gearbox 20. Control system 200 operates positioning actuator 168 to move gearbox 20 longitudinally from rotor shaft second end 48. As gearbox 20 moves from the first position to the second position, gearbox 20 is uncoupled from rotor shaft 24, which reduces the amount of force required to move gearbox 20. As gearbox 20 is uncoupled from rotor shaft 24, control system 200 operates control actuator 134 to impart a force opposite the force imparted to gearbox 20 from positioning actuator 168 to facilitate controlling the rate of movement of gearbox 20. During installation of gearbox 20, control system 200 operates positioning assembly 122 and/or support assembly 120 to facilitate aligning gearbox 20 coaxially with rotor shaft 20. More specifically, control system 200 operates control actuator 134, positioning actuator 168, and/or leveling assembly 136 to move gearbox 20 in the longitudinal direction, transverse direction, and vertical direction to facilitate aligning gearbox 20 with respect to rotor shaft 24.

Figure 5:
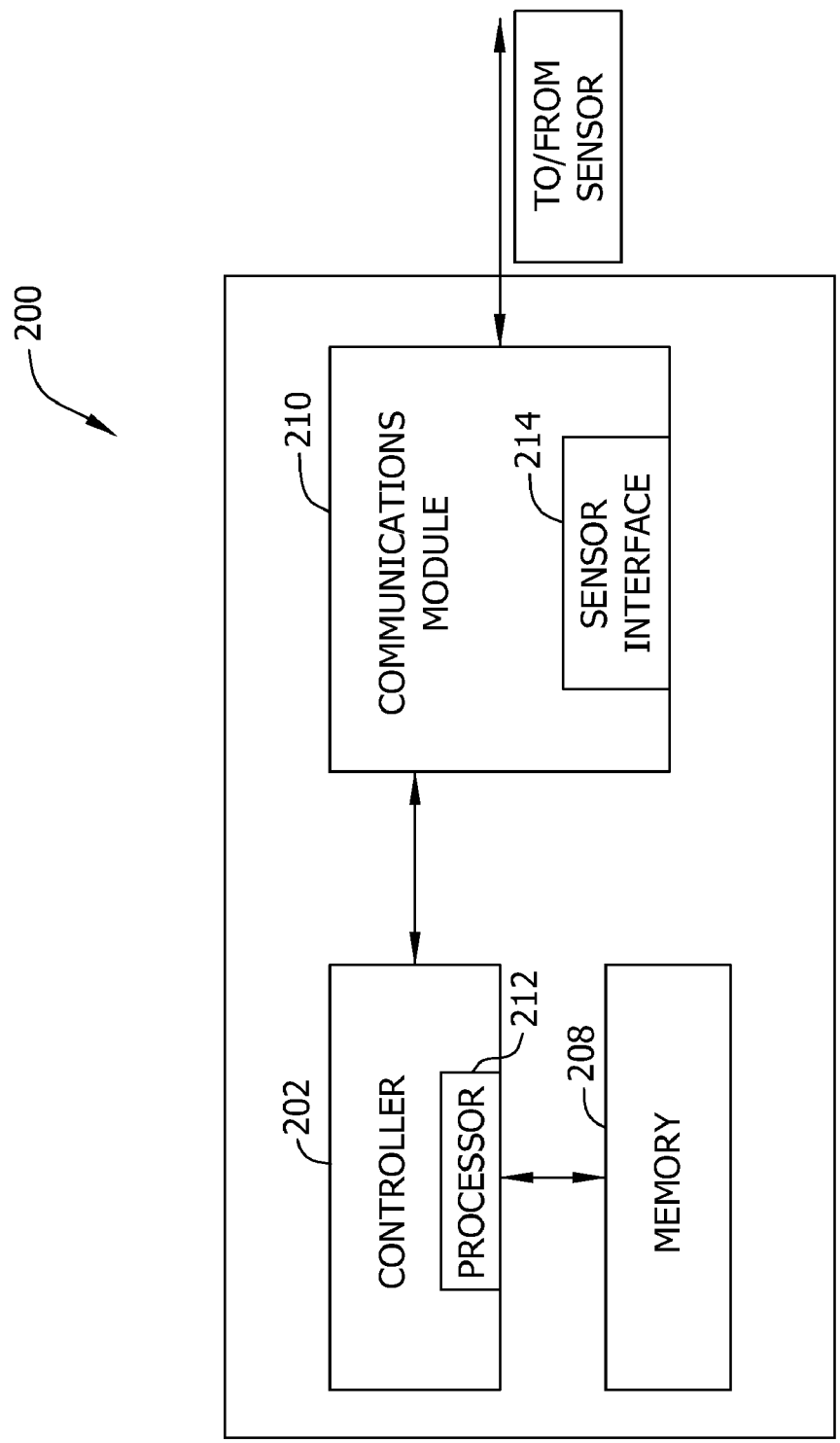
FIG. 5 is a block diagram of an exemplary control system suitable for use with the gearbox handling assembly shown in FIG. 2.

FIG. 5 is a block diagram of exemplary control system 200. In the exemplary embodiment, control system 200 includes controller 202, a memory 208, a communications module 210, and a processor 212. Control system 200 may include any suitable device that enables control system 200 to function as described herein. In the exemplary embodiment, communications module 210 includes a sensor interface 214 that facilitates enabling controller 202 to communicate with sensors 204. In one embodiment, sensor interface 214 includes an analog-to-digital converter that converts an analog voltage signal generated by the sensor to a multi-bit digital signal usable by controller 202. In alternative embodiments, communications module 210 may include any suitable wired and/or wireless communications device that facilitates transmitting signals to and/or receiving signals from any device located on or within, or outside wind turbine 10 and/or remotely from wind turbine 10. In the exemplary embodiment, memory 208 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 208 for use by controller 202 in controlling gearbox handling assembly 30.

In the exemplary embodiment, controller 202 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 202 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome. Processor 212 is configured to perform the methods and/or steps described herein. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 6:
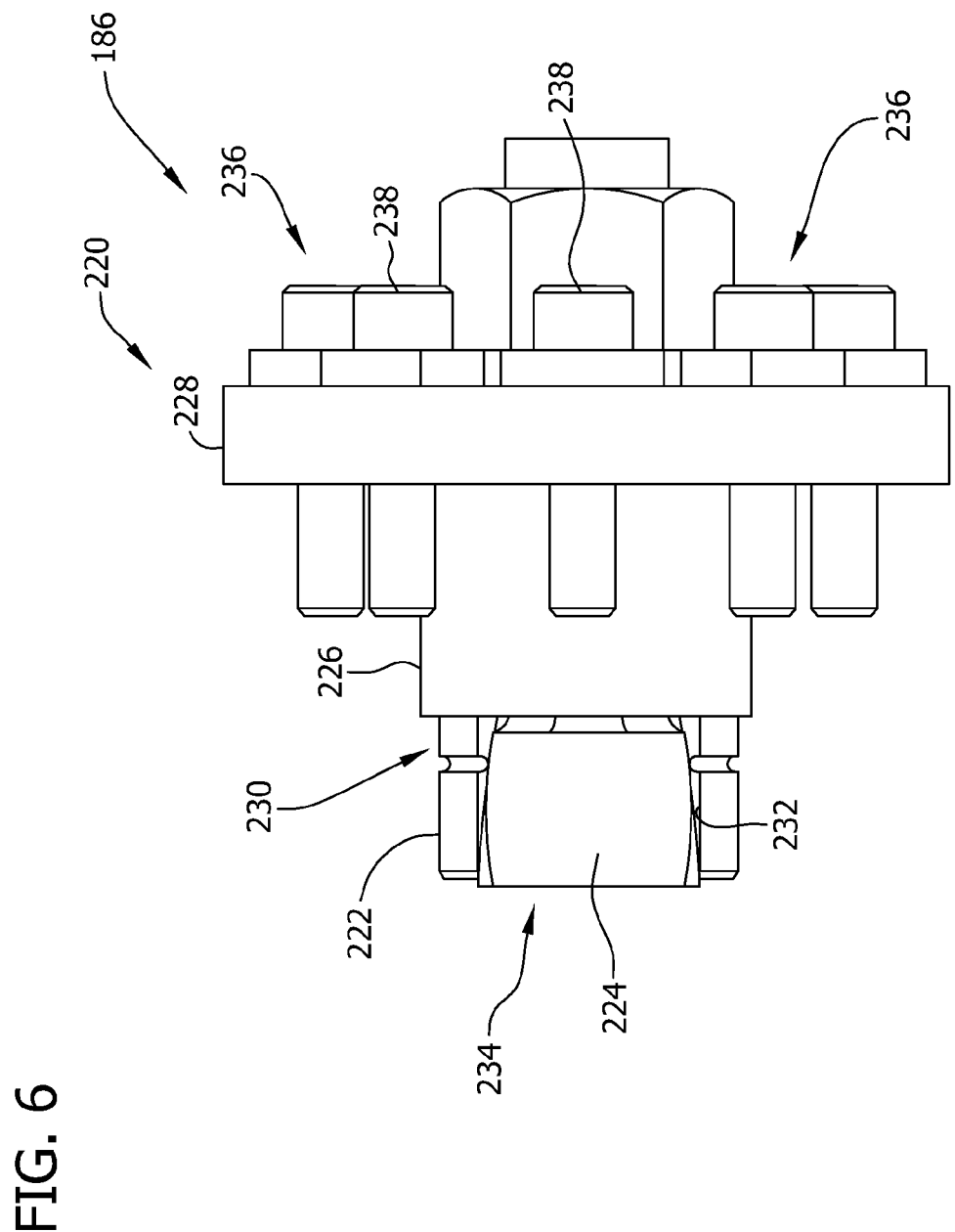
FIG. 6 is a side view of an exemplary rotor lock pin for use with the gearbox handling assembly shown in FIG. 2.

FIG. 6 is a side view of rotor lock pin assembly 186. In the exemplary embodiment, rotor lock pin assembly 186 includes a lock pin housing 220, a rotor lock collet 222, and a lock pin 224. Lock pin housing 220 includes a pin support member 226 and a lock flange 228 that extends circumferentially about pin support member 226. Pin support member 226 has a substantially cylindrical shape and defines a central opening 230 sized to receive lock pin 224 therethrough. Collet 222 is positioned within rotor locking disk opening 54 and has an inner surface 232 that defines an opening 234 sized to receive lock pin 224 such that collet 222 is positioned between lock pin 224 and rotor locking disk 52. Rotor lock pin assembly 186 is positioned adjacent rotor locking disk 52 such that central opening 230 is aligned coaxially with rotor locking disk opening 54. Lock pin 224 is inserted through central opening 230 and though collet 222 positioned within rotor locking disk opening 54. As lock pin 224 is inserted through collet 222, collet 222 expands radially outwardly such that collet 222 forms a friction fit between rotor locking disk 52 and lock pin 224 to facilitate limiting movement between rotor locking disk 52 and lock pin 224. Lock flange 228 includes a plurality of openings 236 that are each sized to receive a corresponding support bolt 238. In the exemplary embodiment, support bolts 238 extend though lock flange 228 and through rotor lock housing 176 to securely couple rotor lock pin assembly 186 to rotor lock housing 176.

The above-described systems and methods facilitate removing and/or replacing a gearbox uptower of the wind turbine without requiring removal of the nacelle, the rotor, and/or the rotor shaft. The ability to remove and/or replace the gearbox without removing the nacelle, the rotor, and/or the rotor shaft from the wind turbine eliminates the need for large lifting cranes required to move the rotor and/or the nacelle. As such, the cost and manpower required to remove and/or replace the gearbox from a wind turbine is significantly reduced. Reducing such costs extends the operational life expectancies of wind turbine systems.

Exemplary embodiments of systems and methods for assembling a gearbox handling assembly for use in a wind turbine are described above in detail. The systems and methods are not limited to the specific embodiments described herein, but rather, components of the assemblies and/or steps of the methods may be utilized independently and separately from other components and/or steps described herein. For example, the methods may also be used in combination with other wind turbine components, and are not limited to practice with only the gearbox systems as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a gearbox handling assembly to facilitate removal of a gearbox from a wind turbine uptower from the wind turbine, the wind turbine including a rotor rotatably coupled to the gearbox with a rotor shaft, the gearbox and the rotor shaft supported from a support frame, said method comprising:
   coupling a support assembly between the gearbox and the support frame for supporting the gearbox from the support frame; and,
   coupling a positioning assembly to the support frame, the positioning assembly configured to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine.

2. A method in accordance with claim 1, further comprising coupling a rotor shaft locking assembly to the rotor shaft to facilitate limiting a rotation of the rotor shaft.

3. A method in accordance with claim 2, wherein the rotor shaft includes a rotor lock disk, said coupling a rotor shaft locking assembly comprises:
   positioning a rotor lock housing adjacent the rotor lock disk;
   coupling the rotor lock housing to the rotor shaft; and,
   coupling at least one rotor lock pin to the rotor lock housing and to the rotor lock disk to facilitate limiting a rotation of the rotor lock disk and the rotor shaft.

4. A method in accordance with claim 1, wherein said coupling a positioning assembly comprises:
   coupling a yoke assembly to the support frame and to the rotor shaft to facilitate limiting an upward movement of the rotor shaft; and,
   coupling at least one actuator to the yoke assembly, the actuator configured to contact the gearbox to move the gearbox between the first position and the second position.

5. A method in accordance with claim 4, further comprising coupling a push ring between the actuator and the gearbox to facilitate uniformly transferring a load from the actuator to the gearbox.

6. A method in accordance with claim 1, wherein the gearbox includes a first torque arm, said coupling a support assembly comprises:
   coupling a first control sled to the first torque arm and to the support frame; and,
   coupling a first control actuator to the first control sled, the first control actuator configured to move said first torque arm along an upper surface of the first control sled.

7. A gearbox handling assembly for use in a wind turbine, the wind turbine including a rotor rotatably coupled to a gearbox with a rotor shaft and a support frame configured to support the gearbox and the rotor shaft, said gearbox handling assembly comprising:
   a support assembly coupled between the gearbox and the support frame for supporting the gearbox from the support frame; and,
   a positioning assembly coupled to the support frame, said positioning assembly adapted to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine.

8. A gearbox handling assembly in accordance with claim 7, further comprising a rotor shaft locking assembly coupled to the rotor shaft to facilitate limiting a rotation of the rotor shaft.

9. A gearbox handling assembly in accordance with claim 8, wherein the rotor shaft includes a rotor lock disk, said rotor shaft locking assembly comprises:
   a rotor lock housing positioned adjacent the rotor lock disk and at least partially circumscribing the rotor shaft; and,
   at least one rotor lock pin inserted through said rotor lock housing and the rotor lock disk to facilitate limiting a rotation of the rotor lock disk and the rotor shaft.

10. A gearbox handling assembly in accordance with claim 8, further comprising at least one yoke brace coupled between said rotor shaft locking assembly and said positioning assembly.

11. A gearbox handling assembly in accordance with claim 7, wherein said positioning assembly further comprises:
   a yoke assembly coupled to the support frame and to the rotor shaft to facilitate limiting an upward movement of the rotor shaft; and,
   at least one actuator coupled to said yoke assembly, said actuator configured to contact the gearbox to move the gearbox from the first position to the second position.

12. A gearbox handling assembly in accordance with claim 11, wherein said positioning assembly further comprises a push ring positioned between said actuator and the gearbox, said push ring configured to facilitate uniformly transferring a load from said actuator to the gearbox.

13. A gearbox handling assembly in accordance with claim 7, wherein said gearbox includes a first torque arm and an opposite second torque arm, said support assembly comprises:
   a first control sled coupled to the first torque arm and to the support frame; and,
   a second control sled coupled to the second torque arm and to the support frame.

14. A gearbox handling assembly in accordance with claim 13, wherein said first control sled comprises:
   a first support block coupled between the first torque arm and said first control sled for supporting the gearbox from said first control sled, said first support block movable along an upper surface of said first control sled; and,
   a first control actuator coupled to said first control sled and to said first support block, said first control actuator configured to move said support block along said first control sled upper surface.

15. A gearbox handling assembly in accordance with claim 14, wherein said second control sled comprises:
   a second support block coupled between the second torque arm and said second control sled for supporting the gearbox from said second control sled, said second support block movable along an upper surface of said second control sled; and,
   a second control actuator coupled to said second control sled and to said second support block, said second control actuator configured to move said second support block along said second control sled upper surface.

16. A wind turbine, comprising:
   a tower;
   a nacelle coupled to said tower;
   a gearbox positioned within said nacelle;
   a rotor;
   a rotor shaft rotatably coupling said rotor to said gearbox;
   a support frame coupled to said gearbox and to said rotor shaft for supporting said gearbox and said rotor shaft within said nacelle; and, a gearbox handling assembly coupled to said rotor shaft and to said gearbox, said gearbox handling assembly comprising:

a support assembly coupled between said gearbox and said support frame for supporting said gearbox from said support frame; and, a positioning assembly coupled to said support frame, said positioning assembly configured to contact said gearbox to move said gearbox between a first position wherein said gearbox is operatively coupled to said rotor shaft and a second position wherein said gearbox is operatively decoupled and spaced from said rotor shaft to facilitate removing said gearbox from said nacelle uptower of said wind turbine.

17. A wind turbine in accordance with claim 16, wherein said gearbox handling assembly further comprises a rotor shaft locking assembly coupled to said rotor shaft to facilitate limiting a rotation of said rotor shaft.

18. A wind turbine in accordance with claim 17, wherein said rotor shaft includes a rotor lock disk, said rotor shaft locking assembly comprising:

a rotor lock housing positioned adjacent said rotor lock disk and at least partially circumscribing said rotor shaft; and, at least one rotor lock pin inserted through said rotor lock housing and said rotor lock disk to facilitate limiting a rotation of said rotor lock disk and said rotor shaft.

19. A wind turbine in accordance with claim 16, wherein said positioning assembly further comprises:

a yoke assembly coupled to said support frame and to said rotor shaft to facilitate limiting an upward movement of said rotor shaft; and, at least one actuator coupled to said yoke assembly, said actuator configured to contact said gearbox to move said gearbox from the first position to the second position.

20. A wind turbine in accordance with claim 16, wherein said gearbox includes a first torque arm, said support assembly comprising:

a first control sled coupled to the first torque arm and to the support frame; and, a first control actuator coupled to said first control sled, said first control actuator configured to move said first torque arm along an upper surface of said first control sled.

* * * * *